United States Patent [19]
Klingspor et al.

[11] Patent Number: 5,635,149
[45] Date of Patent: *Jun. 3, 1997

[54] WET SCRUBBING METHOD AND APPARATUS FOR REMOVING SULFUR OXIDES FROM COMBUSTION EFFLUENTS

[75] Inventors: Jonas S. Klingspor, Birmingham, Ala.; Even Bakke, Stamford, Conn.; Gerald E. Bresowar, Homewood, Ala.

[73] Assignee: ABB Environmental Systems Division of ABB Flakt, Inc., Knoxville, Tenn.

[*] Notice: The term of this patent shall not extend beyond the expiration date of Pat. No. 5,486,341.

[21] Appl. No.: 257,698

[22] Filed: Jun. 9, 1994

[51] Int. Cl.$^6$ .................................................. C01B 17/22
[52] U.S. Cl. .................................. 423/243.08; 423/243.11
[58] Field of Search ........................... 423/243.08, 243.1, 423/243.11

[56] References Cited

U.S. PATENT DOCUMENTS

| | | | |
|---|---|---|---|
| 2,090,142 | 8/1937 | Nonhebel | 423/243.08 |
| 2,113,198 | 4/1938 | Nonhebel | 423/243.08 |
| 4,250,152 | 2/1981 | Biedell et al. | 423/243.08 |
| 4,325,923 | 4/1982 | Bottom et al. | 423/240 R |
| 5,215,672 | 6/1993 | Rogers et al. | 210/787 |

OTHER PUBLICATIONS

Hegemann and Kutemeyer, The Bischoff Flue Gas Desulfurization Process, EPA and EPRI First Combined FGD and Dry SO$_2$ Control Symposium, Oct. 25–28, 1988.

Rader and Bakke, Incorporating Full–Scale Experience into Advanced Limestone Wet FGD Designs, IGCI Forum '91, Washington, D.C., Sep. 12, 1991.

Primary Examiner—Gary P. Straub
Attorney, Agent, or Firm—St. Onge Steward Johnston & Reens

[57] ABSTRACT

Sulfur oxides (SO$_x$) are scrubbed from combustion effluents with aqueous limestone slurries with greater efficiency and with economies in capital and operating costs. In the preferred embodiment of a single-loop, open-tower countercurrent limestone wet scrubber, effluent flow rates are greatly increased while L/G values and reaction tank residence times are decreased. Improved entrainment eliminator design, novel nozzle placement and spacing, and the use of a hydrocyclone to separate and recycle smaller particles of limestone from the byproduct gypsum, facilitate these advantages. The limestone is reduced to very fine particles, e.g. about 8μ or less with more than 99% of the particle by weight less than 44μ, and introduced into a scrubbing slurry which is contacted with SO$_x$-laden effluent.

14 Claims, 4 Drawing Sheets

WET SCRUBBING METHOD AND APPARATUS FOR REMOVING SULFUR OXIDES FROM COMBUSTION EFFLUENTS

TECHNICAL FIELD

The invention relates to improvements enabling the removal of sulfur oxides ($SO_x$) from combustion effluents with greater efficiency and with economies in capital and operating costs.

The combustion of carbonaceous materials containing significant amounts of sulfur, including fossil fuels and waste, is being closely regulated by governments around the world. Combustion of these materials causes free radicals of sulfur and oxygen to combine at the elevated temperatures involved to produce a variety of oxides of sulfur which are referred to as a group as $SO_x$. Regulations are in place in many countries to reduce the amounts of sulfur oxides released to the atmosphere to alleviate the problems associated with acid rain.

Numerous strategies are being employed to reduce the discharge of $SO_x$ to the atmosphere. Among these are methods for cleaning sulfur from fuels prior to combustion, methods for chemically tying up the sulfur during combustion, and methods for removing the sulfur oxides from combustion effluents. Among the methods for treating combustion effluents to remove $SO_x$, are wet and dry scrubbing. Wet scrubbing technology is well developed and effective; however, very large equipment has been required and costs are proportional.

The technology for wet scrubbing combustion effluents to remove $SO_x$ provides gas-liquid contact in a number of different configurations. Among the most prominent are the single- and double-loop countercurrent spray towers and towers which employ both cocurrent and countercurrent sections.

The single-loop, open-tower systems employing calcium carbonate to react with the $SO_x$ are the simplest in construction and operation. These systems are often preferred because they can be operated with low pressure drop and have a low tendency to scale or plug. The advantages of their simplicity and reliability have, however, been offset in some situations by their large size. For example, because they do not employ any trays or packings to improve contact between the effluent and the scrubbing liquid, tower heights are typically high and many levels of spray nozzles have been employed to assure good contact.

In open spray towers, the ability of the scrubbing liquid to absorb $SO_x$ from the gas depends on the availability of alkalinity in the liquid. The most cost effective source of alkalinity for wet scrubbing systems is generally accepted to be calcium carbonate. Unfortunately, calcium carbonate solubility usually decreases with increasing alkalinity in the scrubbing liquid. Towers with packings and trays improve absorption by retaining calcium carbonate longer in the gas-liquid contacting zone, thereby providing a mechanism for more dissolution and, as a result, more efficient use of the scrubbing liquid. Open spray towers, on the other hand, are typically designed relatively taller to provide for as long a contact time as possible, often with multiple spray levels to facilitate the most efficient introduction of scrubbing liquid into the tower.

It would be desirable to improve single-loop, open-tower wet scrubbing employing calcium carbonate for treating $SO_x$-laden combustion effluents, by improving process efficiency with a correspondingly higher process economy while decreasing the overall size requirements of the tower, improving calcium carbonate utilization, maintaining high reliability, reducing energy consumption, and achieving high throughputs with high percentage $SO_x$ reduction.

BACKGROUND ART

The design and operation of single-loop, countercurrent spray towers utilizing limestone is discussed by Rader and Bakke, in *Incorporating Full-Scale Experience Into Advanced Limestone Wet FGD Designs*, presented at the IGCI* Forum 91, Sep. 12, 1991, Washington, D.C. (*formerly the Industrial Gas Cleaning Institute, now the Institute of Clean Air Companies, Washington, DC) Open spray towers (i.e., those not having packings, trays or other means for facilitating gas-liquid contact) are simple in design and provide high reliability.

The use of a variety of reagents has been suggested, but the most preferred are those which are effective without high additive levels and can be purchased at low cost and stored and transported with minimal special handling. Calcium carbonate (commercially available in a number of forms including limestone) is a material of choice because it meets these criteria and, when properly processed, yields process byproducts that can be easily disposed of as landfill or sold as gypsum.

In single-loop, countercurrent, open scrubbing towers of the type discussed by Rader and Bakke, a scrubbing liquid based on calcium carbonate flows downwardly while the $SO_x$-laden effluent flows upwardly. They summarize historical values for a range of parameters, including absorber gas velocity (giving a minimum of 6 and a maximum of 15 feet per second, i.e. about 2 to less than 5 meters per second), indicating that absorber gas velocity has a weak influence on the liquid-to-gas ratio (L/G), a key factor in both capital and operating expenses. The height of the spray contacting zone in these towers is not given, but typical values will be on the order of from about 6 to about 15 meters, historically considered an important factor in engineering an efficient system which can be expected to reliably remove at least 95% of the $SO_x$ from combustion effluents.

In conventional towers of this type, the ratio of the quantity of slurry to the quantity of gas (L/G) is said to be arguably the single most significant design parameter. The L/G affects the cost of pumping, the cost of holding tanks and other operational and economic factors. The cost of pumping the limestone slurry increases proportionally with the tower height. It would be desirable to decrease L/G requirements and height for open spray towers.

Sulfur oxides ($SO_x$), principally $SO_2$, are absorbed in the descending scrubbing slurry and collected in a reaction tank where solid calcium sulfite and solid calcium sulfate are formed. Desirably, the reaction tank is oxygenated to force the production of the sulfate. Once the crystals of sulfate are grown to a sufficient size, they are separated from the slurry in the reaction tank.

In a paper by K. R. Hegemann, et al, entitled *THE BISCHOFF FLUE GAS DESULFURIZATION PROCESS* (presented at the EPA and EPRI cosponsored First Combined FGD and Dry $SO_2$ Control Symposium, Oct. 25–28, 1988) a scrubbing tower is depicted as including a hydrocyclone loop which separates a gypsum slurry from a wet scrubber into a coarse solids stream and a fine solids stream, with the fine solids stream being returned to the scrubber. In U.S. Pat. No. 5,215,672, Rogers, et al. describe a process similar to that of Hegemann, et al. in that it employs a hydrocyclone as a primary dewatering device. In the latter case, after separating a fine solids stream from a coarse solids stream rich in gypsum, water as part of a thickened fines stream is disposed of along with at least a portion of the fines removed. Neither of the descriptions of these approaches, however, indicates how the use of a hydrocyclone as a primary dewatering device can be employed to improve overall process efficiency with a correspondingly higher process economy while decreasing the overall size requirements of the tower, improving reagent utilization, maintaining high reliability, reducing energy consumption, and achieving high throughputs with high percentage $SO_x$ reduction.

The art has also provided packed towers. Rader and Bakke point out that while these types of towers have some advantage in terms of decreased operating costs, they present additional risks. The packings or other gas-liquid mixing means can become clogged or corroded and cause unacceptable bypass or pressure drop, resulting in prolonged periods of downtime. It would be advantageous to have an open tower which had the advantages of the packed towers, but which did not require the packings, and was smaller than open towers of conventional construction.

The prior art does not directly address the points necessary to achieve improvements that, in the context of single-loop, open-tower, countercurrent limestone wet scrubbers for $SO_x$ reduction, permit results comparable to achieved with packed towers but without the use of packings or the problems associated with them.

DISCLOSURE OF THE INVENTION

It is an object of the invention to provide improved processes and apparatus for wet scrubbing combustion effluents, especially from coal-fired boilers, to remove sulfur oxides.

It is another object of a preferred embodiment of the invention to provide improved single-loop, open-tower, countercurrent limestone wet scrubbers for $SO_x$ reduction.

It is a further object of the invention to enable operation of single-loop, open-tower, countercurrent limestone wet scrubbers at reduced L/G values.

It is a yet further object of the invention to reduce the size of single-loop, open-tower, countercurrent limestone wet scrubbers.

It is another specific object of the invention to increase the velocity of the flue gas through single-loop, open-tower, countercurrent limestone wet scrubbers.

It is yet another object of the invention to improve the design and location of entrainment separators and mist eliminators in single-loop, open-tower, countercurrent limestone wet scrubbers to effectively demist scrubbed effluents and change their direction away from the roof of the scrubbing tower.

It is a yet further object of the invention to improve the operation of single-loop, open-tower, countercurrent limestone wet scrubbers to reduce the residence time of gypsum crystals in the scrubber and enable the use of a hydrocyclone to separate them from smaller particles of limestone.

It is still another object of a preferred embodiment of the invention to improve the operation of single-loop, open-tower, countercurrent limestone wet scrubbers by reducing the residence time of gypsum crystals in the scrubber and enabling the use of a hydrocyclone to maintain operation at high stoichiometric ratios of calcium to sulfur while fostering high utilization of calcium carbonate.

It is a still further object of a preferred embodiment of the invention to improve the process efficiency of single-loop, open-tower, countercurrent limestone wet scrubbers by achieving effective liquid to gas contact within a scrubbing zone of reduced height utilizing a reduced number of spray levels.

It is a yet another object of a preferred embodiment of the invention to improve the operation of single-loop, open-tower, countercurrent limestone wet scrubbers by improving the arrangement of the spray nozzles to minimize the amount of gas passing through without being treated and to achieve effective gas-liquid contact with a reduced number of spray nozzles.

These and other objects are accomplished by the invention which provides both improved processes and apparatus for wet scrubbing, particularly the scrubbing of effluents from the combustion of sulfur-containing fuels such as coal and solid waste.

In one aspect, the invention improves a single-loop, open-tower, countercurrent limestone wet scrubbing process for reducing the concentration of $SO_x$ (principally $SO_2$) in flue gases. In another, the invention provides an improved apparatus capable of achieving the noted improvements and will be described in detail in the following description. The process, in summary, comprises: (a) directing a flow of flue gas containing $SO_x$ upwardly through a vertical scrubbing tower at a bulk flow velocity of greater than about 4.5, and preferably up to about 6, meters per second; (b) introducing into a vertical scrubbing section within said tower, a spray of droplets of an aqueous slurry of finely divided calcium carbonate, calcium sulfate, calcium sulfite, and other non-reactive solids, the calcium carbonate preferably having a weight median diameter of 6μ or less with 99% by weight less than 44μ, and a total molar ratio of calcium-containing to sulfur-containing compounds in the solids of at least 1.1 to 1.2, to contact the flue gas while descending through the tower countercurrently to the flow of flue gas; (c) collecting the slurry in a reaction tank after contact with the flue gas; (d) withdrawing slurry from the reaction tank, preferably after an average residence time of eight hours or less; (e) subjecting slurry withdrawn from the reaction tank to a dewatering treatment, preferably in a hydrocyclone, to provide a recycle stream composed of the hydrocyclone overflow rich in fine particles of calcium carbonate and having a total molar ratio of calcium-containing to sulfur-containing compounds of 1.3 or greater and another stream composed of the hydrocyclone underflow rich in calcium sulfate particles, preferably having a weight median diameter of from about 25 to about 55μ; (f) returning to the process a major portion of the recycle stream rich in calcium carbonate; and (g) introducing fresh calcium carbonate and other non-reactive solids as feed into the system in amounts sufficient to replace the calcium withdrawn and not recycled as well as that dissolved and reacted with the $SO_x$ absorbed in the liquid phase in the scrubber tower, said finely-divided calcium carbonate having a weight median particle size of less than about 10μ as introduced.

It is preferred that the slurry be introduced from spray nozzles, alternating between upward and downward orientation from two spray levels spaced from about 1 to about 2 meters apart. It is also preferred that the total tower height in the spray contacting zone be less than about 6, and preferably less than about 4, meters in height, as it has been determined that height is not so important for reliably removing 95% or more of the $SO_x$ from combustion effluents. It is an advantage of the invention that the tower diameter can be relatively small, so that the operating bulk velocity of flue gas passing vertically through the spray contacting zone, based only on the cross sectional area and neglecting the area taken up by spray headers and nozzles, be no less than 4.5 and preferably up to 6 meters per second. This higher velocity provides a means of suspending liquid in the tower without increasing tower height and without adding packing or trays for liquid holdup, and the liquid so suspended is more reactive due to the increased time for dissolution of the calcium carbonate. Hence a distinct advantage of the invention is to increase tower contacting time without adding tower height, while at the same time maintaining the simplicity of design, construction, operation, and maintenance of an open spray tower.

In the more preferred embodiments, the median size of the calcium carbonate particles in the reaction tank is maintained within the range of from about 2 to about 6µ, and the weight median particle size of the finely-divided calcium carbonate as introduced is less than about 8µ, with 99.5% by weight of the particles being less than 44µ.

It is advantageous for all countercurrent, open spray towers, packed towers, or towers with trays, that the molar ratio of calcium-containing to sulfur-containing compounds in the solid phase of the scrubber slurry be high. High ratios make more alkalinity available for $SO_x$ removal, thus improving the absorptive capacity of the liquid. However, in current processes, a high ratio is not economical because valuable calcium-containing compounds, specifically calcium carbonate, will be wasted with the removal of sulfur compounds via the dewatering system. The invention permits operation with a scrubbing slurry in the spray tower for which the solid calcium carbonate concentration is much higher than economically viable for other systems. When utilizing the preferred conditions of particle size and gas-liquid contact, the hydrocyclone is effective in increasing the relative concentration of available calcium and alkalinity in the tank. Desirably, the hydrocyclone is operated to withdraw from the process sufficient calcium sulfate to maintain the molar ratio of calcium to sulfur in the recycle stream at a value greater than about 1.3.

It is also preferred to maintain a suspended solids concentration of less than about 10%, and most preferably less than about 5%, in the recycle stream. Preferably, the process further includes determining both the chloride content and the suspended solids concentration in the recycle slurry, and discharging a portion of the recycle slurry stream should either the chloride content or suspended solids concentration be greater than targeted levels.

In the preferred embodiments, the scrubbing tower comprises at least a first entrainment separator to remove a significant amount of the entrained moisture and to turn the direction of flow of the flue gases by at least 30° from the vertical axis of the tower. In its preferred form, the majority of droplets having diameters less than about 100µ are eliminated either by dropping them out of the effluent or consolidating them to form larger droplets which can more easily be removed by a downstream mist eliminator. The first entrainment separator is preferably followed by a generally vertical mist eliminator.

One effect of these improvements is a tower which is about one half the weight and volume of the current open-tower scrubbers. Process efficiency is improved with a correspondingly higher process economy while reagent utilization is improved, high reliability is maintained, energy consumption is reduced, and high throughputs with high percentage $SO_x$ reduction are achieved.

BRIEF DESCRIPTION OF THE DRAWINGS

The invention will be better understood and its advantages will be better appreciated from the following detailed description, especially when read in light of the accompanying drawings, wherein.

INDUSTRIAL APPLICABILITY

The improvements of the invention have preferred application to coal-fired utility boiler flue gases, and in some aspects are particularly effective for high chloride operations such as incinerators. While the advantages may be the greatest in these types of operations, the invention is by no means limited to them. Effluents from the combustion of all types of carbonaceous materials can be treated, also including natural gas, synthetic gas, fuel oils, bitumens and residual fuel oils, domestic and industrial solid or other combustible waste, and the like.

Figure 1:
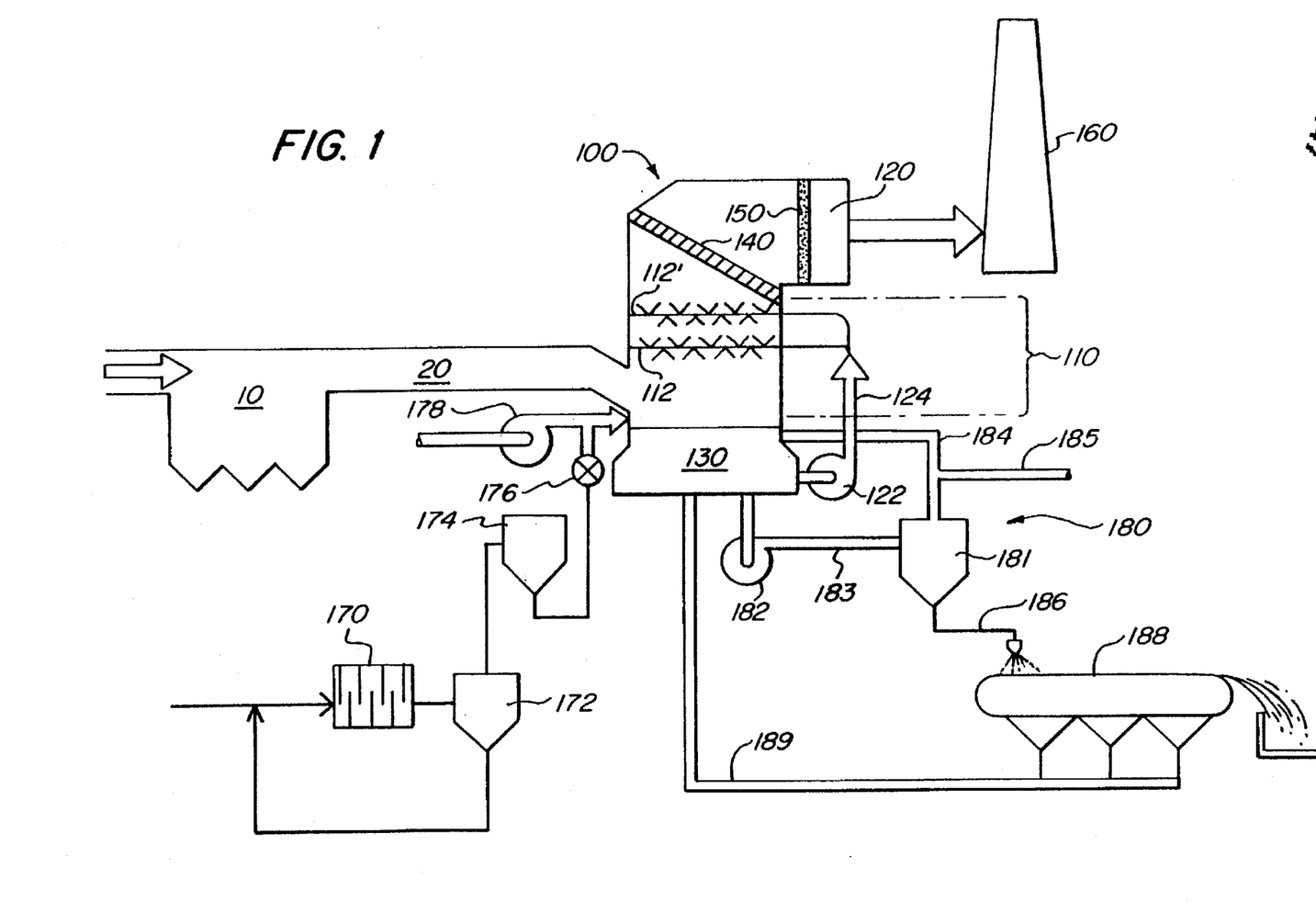
FIG. 1 is a schematic view of a preferred embodiment of the process of the invention employing a single-loop, open-tower, countercurrent limestone wet scrubber.

The following description is centered on the preferred embodiment of FIG. 1 which is a single-loop, open-tower, countercurrent limestone wet scrubbing operation for removing sulfur oxides, principally as $SO_2$, from combustion effluents.

Limestone is the preferred form of calcium carbonate but can be replaced with another form, if desired. In addition to limestone, other forms of calcium carbonate include oyster shells, aragonite, calcite, chalk, marble, marl, and travertine. It can be mined or manufactured. In this description, the terms calcium carbonate and limestone are used interchangeably.

The limestone is finely divided, preferably by grinding as described below, to achieve a weight median diameter of about 10µ or less, with 99% below 44µ. This is extremely fine for wet scrubbing in an open tower with a countercurrent flow of limestone slurry. The more typical grind size of the prior art is a weight median diameter of 15µ or less with no more than 95% of the particles less than 44µ. In further contrast to the prior art, it is noted that the preferred grind size of the invention will yield particles with a weight median particle size of less than about 8µ, with 99.5% by weight of the particles being less than 44µ. The use of a grind of the preferred size has several advantages.

The preferred process arrangement of FIG. 1 shows an effluent, such as from a coal-fired industrial or utility boiler, entering a suitable means 10 for removing particulates, such as an electrostatic precipitator or fabric filter, which removes entrained solids to a practical extent. The cleaned flue gas is then passed via duct 20 to wet scrubbing tower 100 wherein it flows upwardly, countercurrent to a spray of an aqueous slurry which contains finely-divided limestone discharged within a vertical scrubbing section 110 from two levels of spray nozzles. From the scrubbing section 110, the gas continues through gas outlet duct 120. The tower is configured to direct a flow of flue gas upwardly through the vertical scrubbing section. The scrubbing slurry falling through the vertical scrubbing section 110 is collected in reaction tank 130. The reaction tank 130 is preferably of a size suitable to permit reaction of the $SO_2$ with the calcium carbonate to form crystals of gypsum having a weight median diameter at least 2, and preferably from 5 to 10, times as large as the particles of calcium carbonate added as feed.

Maintenance of this differential in particle sizes facilitates the preferred embodiment which calls for withdrawing a stream of slurry from the reaction tank, preferably after an average residence time of about 6 hours, and concentrating it in terms of calcium carbonate (as fine particles, preferably having a weight median diameter of less than about 6μ) and removing gypsum.

The vertical scrubbing section 110 contains an array of spray devices positioned within it. The array is configured to introduce a spray of an aqueous slurry of finely-divided calcium carbonate to descend through the tower countercurrently to the flow of flue gas. The Figure illustrates a bank of spray nozzles which is shown to include two levels 112, 112' of nozzles. Each of the nozzles 114 (see FIG. 2) is fed slurry from a header 116, 116', or 116". It is typical to also include a third level to permit one level to be off line for repair or cleaning while two remain in operation.

Figure 4:
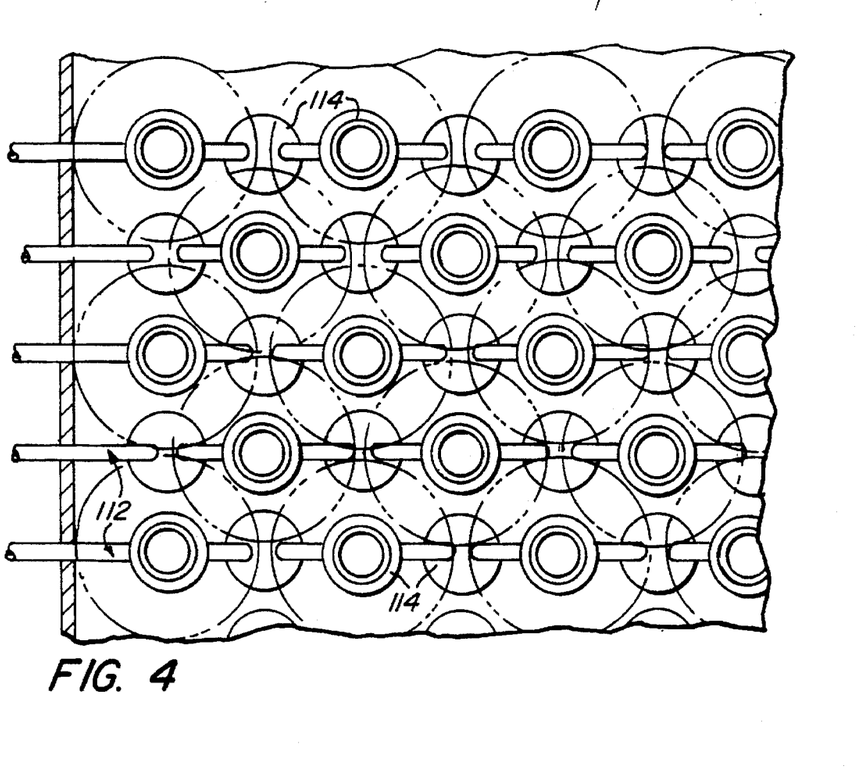
FIG. 4 is a bottom plan view of the spray nozzles in the two spray levels for a spray tower of the type shown in FIG. 2.

The nozzles are preferably arranged with a spacing between levels of from about 1 to less than about 2 meters and with the direction of flow from adjacent nozzles in a given level alternating between upward and downward. The preferred embodiments of the invention reduce the spacing between the nozzles, reduce the number of levels in use at any time (preferably to 2), and increase the rate of gas flow upwardly through the vertical scrubbing section. The preferred flow patterns of both the slurry being sprayed and the effluent passing upward through the tower are illustrated in FIG. 4.

The preferred form of nozzle is a centrifugal nozzle which forms a spray at an angle α of within the range of from about 90 to about 140°, preferably about 120°. One suitable nozzle is a Whirljet 300 gallon per minute nozzle available from Spraying Systems Co., Wheaton, Ill. Droplet sizes are preferably in the range of from about 100 to about 6000μ, typically about 2000μ, Sauter mean diameter as measured by a Malvern Particle Analyzer.

Each of the headers 116 is oriented at an angle with respect to the header in the next upper or lower rack. The angle is preferably 90° when two or three racks are employed.

It is one of the novel and improved features of the invention that the residence time in the reaction tank is reduced from the typical commercial value of about 15 hours or more down to less than about 8 hours, more typically about 6 hours. This is facilitated by the improved dissolution rate of fine calcium carbonate particles and, to some extent, the relatively fast precipitation rate of calcium sulfate to form gypsum particles. The reactive properties of the slurry are, in turn, enhanced by the separation of calcium sulfate from calcium carbonate in the slurry and recycling the calcium carbonate to the slurry as very fine particles which dissolve rapidly in the reaction tank. The reduction of the residence time in the reaction tank has a positive impact on overall process efficiency as well as a number of advantages in terms of processing ease, equipment sizing and quality of the byproduct gypsum.

The bulk gas velocities of the flue gas moving through the vertical scrubbing section 110 are above 4.5, and preferably up to about 6, meters per second. These gas velocities are high in the context of single-loop, open-tower wet limestone scrubbers and are employed by the invention preferably in combination with other innovative approaches to improve overall process efficiency. The preferred scrubbing towers of the invention enable the treatment of flue gases with practical, low pressure drops and lower relative amounts of aqueous slurry, e.g. lower L/G ratios.

The sulfur oxides in the effluent are absorbed into the aqueous phase of the slurry, forming bisulfite and hydrogen ions. Some bisulfite oxidizes to sulfate, releasing even more hydrogen ions. As the droplets become saturated with hydrogen ions, calcium carbonate begins to dissolve at an increasing rate, thus forming calcium ions and bicarbonate. The finely-pulverized calcium carbonate is very effective at absorbing hydrogen ions, thereby improving the absorptive capacity of the aqueous phase in the tower spray zone. The high gas velocities employed according to the preferred embodiments, and the preferred spray pattern, tend to maintain the slurry droplets suspended with a degree of fluidization to achieve enhanced contact.

FIG. 1 shows limestone being finely divided in a mill 170, classified by cyclone 172, captured by bag house 174 and metered through air lock 176 into the pressurized flow of air in line 178. By pulverizing the limestone immediately before introduction into the scrubber, the limestone which is introduced into the reaction tank to replenish the calcium carbonate can be made within well-defined particle size ranges, free from large particles, those greater than about 44μ. In fact, it is typically possible and routinely achieved with dry pulverizing calcium carbonate particles of weight median size less than about 8μ and with 99% or more less than 44μ. The exclusion of the large particles from the limestone introduced into the reaction tank is a principal feature permitting the reaction tank of the invention to be made substantially smaller than is presently employed in conventional scrubbers.

The air in line 178 facilitates supplying oxygen for the oxidation of sulfite and bisulfite ions to sulfate ions. The tank is preferably stirred by conventional means which are not illustrated in the Figure.

On the other side of the process as illustrated in FIG. 1, slurry is withdrawn from reaction tank 130 for concentrating the reactive calcium carbonate for recycle and reducing the level of solids, principally by removing gypsum. FIG. 1 shows slurry being withdrawn from reaction tank 130 via line 183 and passed to hydrocyclone 181. The hydrocyclone is especially effective in the operation of the invention because it can rapidly and effectively separate the very fine particles of limestone from the larger particles of calcium sulfate. The particles of the calcium sulfate preferably have a weight average diameter of from about 25 to about 55μ. The separation of the smaller particles of limestone provides a recycle stream 174 rich in calcium carbonate and a discharge stream 176 rich in calcium sulfate. Preferably, the weight average particle size of the calcium carbonate in the reaction tank and therefore in the recycle stream 184 is in the range of from about 2 to about 6μ.

FIG. 1 shows the preferred form of the invention wherein the recycle stream is concentrated in terms of calcium carbonate and useful process water in hydrocyclone 181. The preferred sizes for the calcium carbonate particles will have a weight median diameter in the range of from about 2 to about 6μ. The calcium sulfate particles will have a weight median diameter within the range of from about 25 to about 55μ. Preferably, the weight median diameters of particles of calcium sulfate will be at least 2, and preferably from 5 to 10, times greater than those of calcium carbonate.

This system includes at least one pump 182 and associated conduit 183 for withdrawing slurry from the reaction tank and delivering slurry to the hydrocyclone.

A recycle conduit 184 is shown to lead from the hydrocyclone 181 to the reaction tank 130 to carry a recycle stream rich in calcium carbonate from the hydrocyclone. A feature of the preferred system is achieving blow down from the recycle overflow, namely from recycle stream 184 via discharge conduit 185. Conduit 184 is adapted to remove a portion of the recycle stream. An advantage of operating in this manner is the ability to remove both excess inert matter which is introduced with the finely pulverized limestone or as fly ash and other solids in the untreated flue gas 20 and to control dissolved chlorides. The inert solids generally have a weight median particle size of 12μ or less and if not purged to some extent via stream 185 tend to build up in the reaction tank 130, thereby displacing both gypsum and calcium carbonate in the slurry solids. This diminishes valuable alkalinity for $SO_x$ absorption in the tower spray zone. Besides removing the inerts, it is desirable to adjust stream 185 to control the level of dissolved chlorides in the reaction tank 130. Therefore, the purpose of stream 185 is generally two-fold: to control the level of undesirable inert solids in the scrubbing slurry and to control the level of dissolved chlorides in the scrubbing liquid.

The process permits operation at pH values that enhance reactivity. Preferably, the pH of the slurry in the reaction tank is within the range of from about 5.0 to about 6.3, and most preferably in the range of from about 5.8 to about 6.3.

Desirably, the hydrocyclone or other device capable of concentrating the calcium carbonate in the recycle stream, is operated to withdraw from the process sufficient calcium sulfate to maintain the molar ratio of calcium-containing to sulfur-containing compounds in the recycle stream at a value greater than about 1.3, preferably above about 1.4. Also, it is preferable to maintain a suspended solids concentration of less than about 10%, and most preferably less than about 5%, in the recycle stream. Preferably, the process further includes determining the chloride content of the slurry, and discharging a portion of the recycle stream in response to the determined chloride content.

Separation of the majority of the calcium sulfate from the limestone by hydrocyclone 181, in addition to raising the pH, the noted stoichiometric ratio and the available alkalinity, decreases the solids content of the slurry. Preferred solids levels for stream 184 are within the range of from about 2 to about 10%, e.g. about 4%. The solids content of stream 183 coming from the reaction tank 130 is preferably within the range of from about 10 to about 20%. And, the solids content of stream 186 is preferably within the range of from about 30 to about 55%. Stream 186 is fed to filter 188 or other suitable device to dewater the slurry. The solid gypsum is of high quality and can be sold. The flitrate is drawn off by line 189 and recycled to the reaction tank 130.

It is an advantage of the invention that, when utilizing the preferred conditions of particle size and gas-liquid contact, a hydrocyclone can be effective in reducing the concentration of solids in the reaction tank and increasing the relative concentration of available calcium and alkalinity in the tank. Desirably, the hydrocyclone is operated to withdraw from the process sufficient calcium sulfate to maintain the molar ratio of calcium-containing to sulfur-containing compounds in the recycle stream at a value greater than about 1.3, preferably above about 1.4. Also, it is preferable to maintain a suspended solids concentration of less than about 10%, and most preferably less than about 5%, in the recycle stream. Preferably, the process further includes determining the chloride content of the slurry, and discharging a portion of the recycle stream in response to the determined chloride content.

The scrubbed effluent is significantly freed of entrained droplets of liquid and diverted in direction of flow by entrainment separator 140. At the high gas velocities enabled by the invention, problems of encrustation of the roof 102 of the tower and of mist eliminators of conventional construction would be experienced unless measures were taken. The use of a more efficient mist eliminator in lieu of the entrainment separator 140 is not feasible, since at operating bulk velocities of 4.5 to 6 meters per second, no practical, high-efficiency mist eliminators are available, and commercial units which could be specified for this location tend to drain poorly and flood, thus increasing the potential for pluggage and low reliability. Hence, the entrainment separator 140 is designed for the specific purposes required by this invention.

Preferably, the entrainment separator 140 removes a significant amount of the entrained moisture and turns the direction of flow of the flue gases by at least 30° from the vertical axis of the tower, also producing a more uniform velocity profile into the vertical mist eliminator 150. In its preferred form, the majority (by weight) of droplets having diameters less than about 100μ are eliminated either by dropping them out of the effluent or consolidating them to form larger droplets which can more easily be removed by a downstream mist eliminator.

The entrainment separator 140 is preferably followed by a generally vertical mist eliminator, shown in the Figures as 150. The bulk of the effluent flow is changed from vertical to near horizontal by the entrainment separator 140. This has several advantages including the reduced impingement of slurry onto the roof 102 of the scrubbing tower, with prevention of the formation of deposits there which tend to grow larger in time, to an extent that they can break off in large pieces, often as much as a meter or more in diameter, and either damage the nozzle headers or fall through to the reaction tank 130 and ultimately cause plugging of the spray nozzles in 112 and 112'. Also, and importantly, it permits high-efficiency demisting of an essentially horizontal flow by vertical mist eliminator 150. The high-efficiency horizontal flow mist eliminator 150 inherently drains well, thus allowing operation at higher velocities than for a similarly designed, vertical flow mist eliminator. It also achieves superior demisting in the horizontal flow orientation. A high degree of demisting is an important feature of the invention, although not necessarily unique, since horizontal flow mist eliminators are commonly used in FGD systems and other industries where high-efficiency demisting is required. However, it is a unique feature that the combination of the entrainment separator 140 with the high-efficiency mist eliminator 150 provides superior demisting by providing a relatively uniform velocity profile into the mist eliminator and by consolidating the majority of smaller droplets into larger droplets in the entrainment separator prior to final demisting in the high-efficiency mist eliminator.

Figure 2:
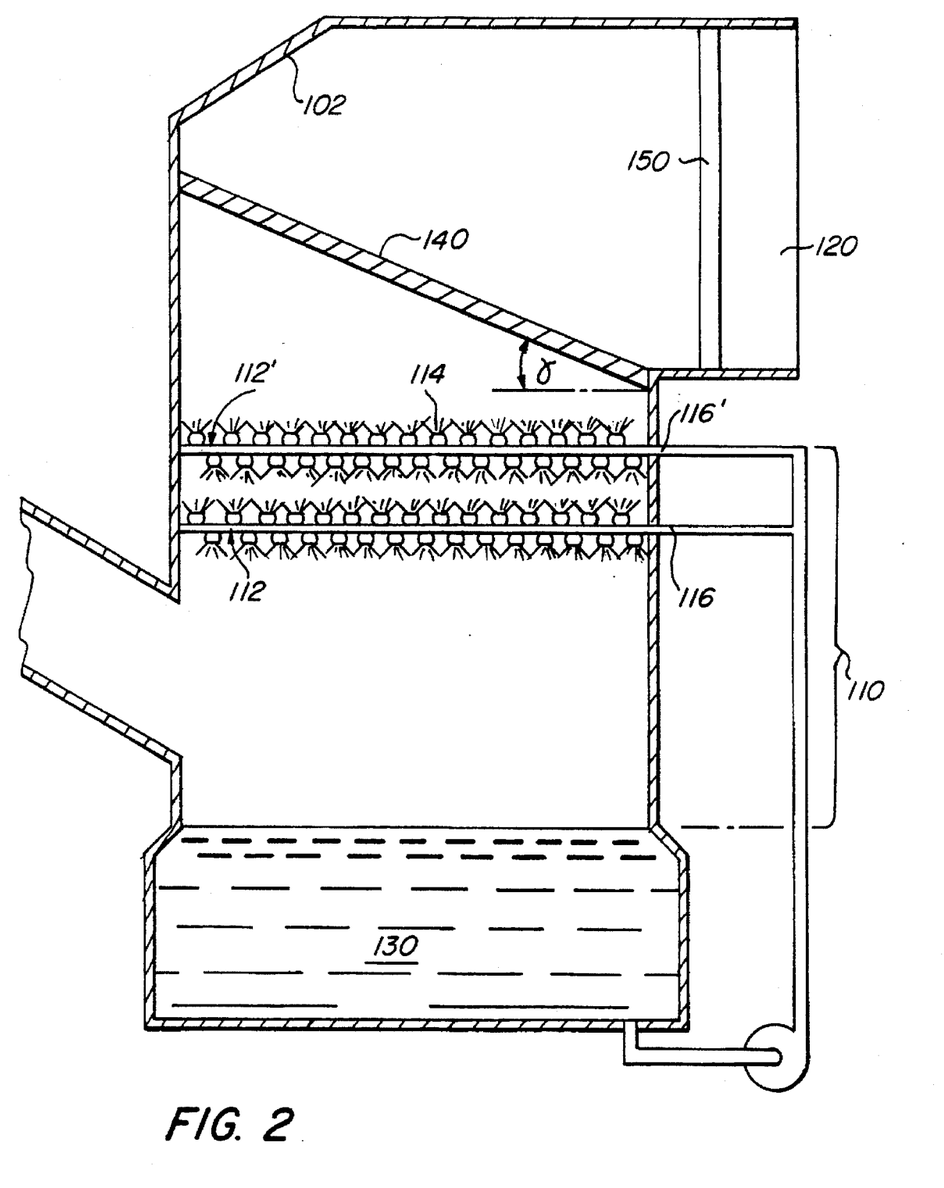
FIG. 2 is a more detailed schematic view of a scrubbing tower of the type shown in FIG. 1.
Figure 3:
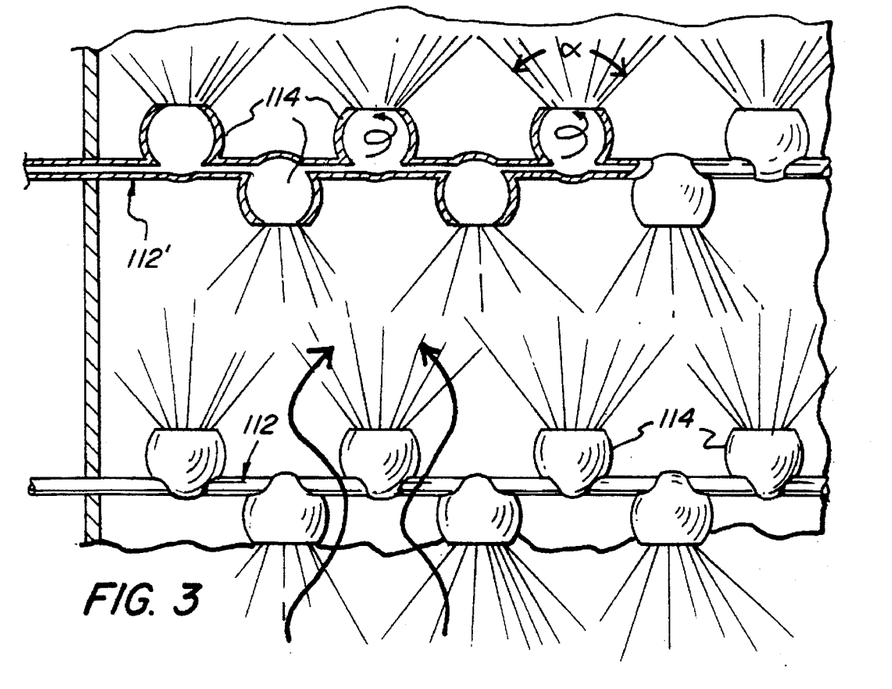
FIG. 3 is a partial side elevational view of the arrangement of spray nozzles in two spray levels shown in the tower of FIG. 2.
Figure 5:
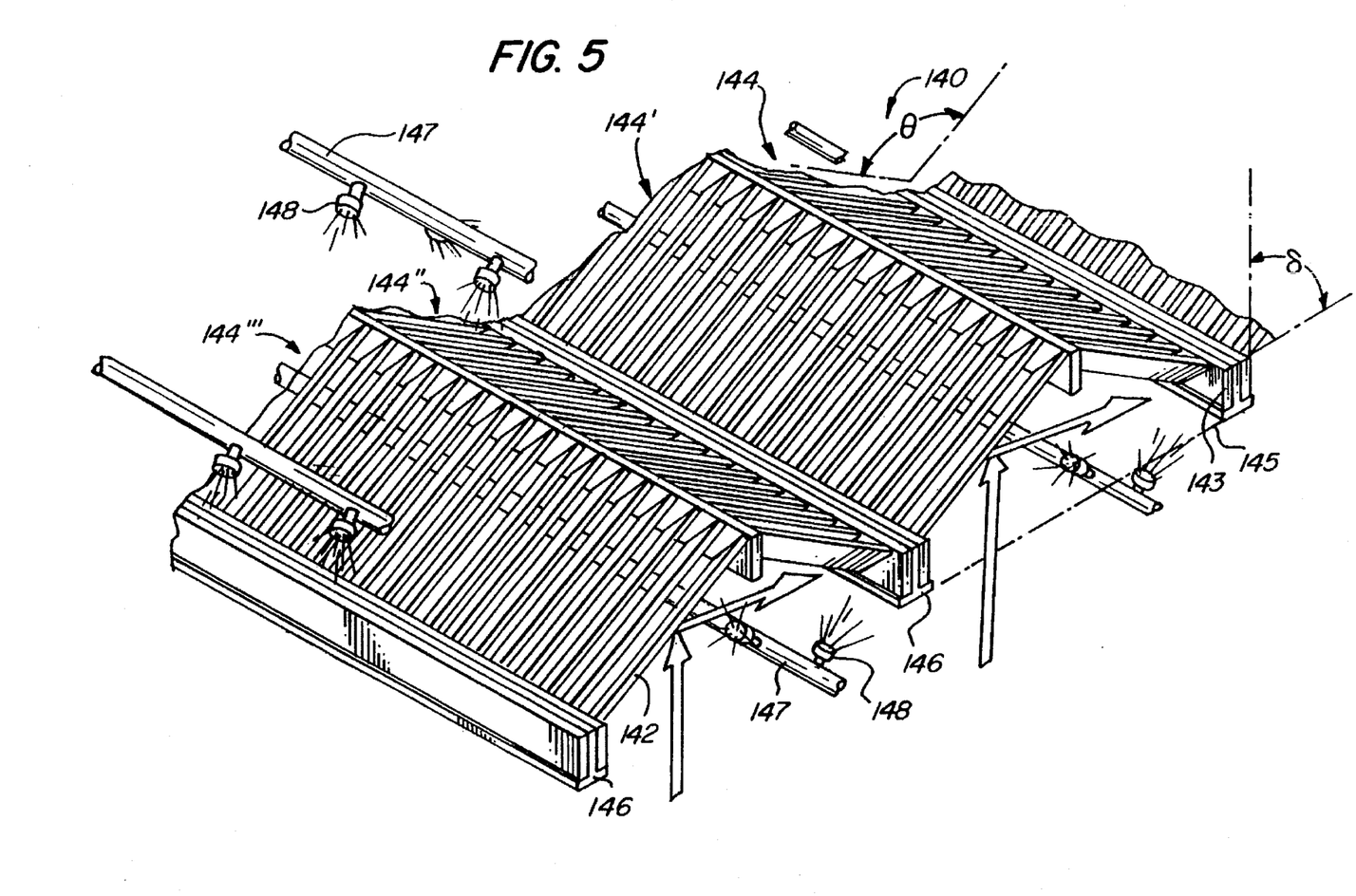
FIG. 5 is a perspective view of the entrainment separator shown in the spray tower of FIGS. 1 and 2.

FIG. 5 illustrates a preferred form of an improved entrainment separator 140 which can effectively remove or consolidate a majority of the smaller droplets (i.e., less than 100μ diameter) and redirect the vertical flow of the effluent away from the upper wall surfaces of the tower. Entrainment separator 140 is illustrated in FIG. 2 as oriented at an angle γ relative to the horizontal in scrubbing tower 100. This angle will preferably be within the range of from about 10° to about 45°, e.g. about 20°.

The separator 140 utilizes single pass separator blades 142 to collect droplets by impingement and to turn the gas in a direction most suitable for further mist elimination. The individual blades 142 are oriented at an angle δ with regard to the lower surface of assemblies 144, 144', 144", etc., of the blades 142. Typically, a blade of this type will be a parallelogram-shaped piece of from about 0.15 to about 0.23 meters in minor dimension and from about 0.6 to about 1.5 meters in major dimension. Spacing between individual blades will typically be from about 40 to about 70% of the minor dimension of the individual blades. Angle δ will preferably be within the range of from about 20° to about 40°, the exact value depending on the angle δ and the desired degree of flow direction of the effluent stream.

The assemblies 144, etc., are constructed and oriented in a fashion that facilitates excellent drainage. The individual assemblies are arranged in a pattern of chevrons as illustrated. The assemblies 144, etc., are preferably oriented with respect to one another at an angle θ, typically in the range of from about 125° to about 145°, and preferably about 140°. The entrainment separator structure is supported by members 146 which run the lengths of each of the assemblies. Other arrangements of supporting structures are possible.

The structure of the entrainment separator 140 permits direct contact washing of the blades by means of fixed nozzle lances 147 having spray nozzles 148 capable of spraying wash water directly onto the blades from both the top and the bottom. Washing is typically done by operating each washer header separately and sequentially with the others. The wash water is of sufficient quality and is used in sufficient quantity to reduce the level of saturated, dissolved salts on the separator surfaces. Together with the good drainage afforded by the chevron-shaped arrangement of assemblies 144, etc., the use of high quality wash water and frequent washing affords practically deposit-free operation.

It is a feature of the invention that the separation efficiency of the first entrainment separator 140 need not be as high as multipass separators employed in the prior art because the ability to redirect the flow from vertical to horizontal enables the use of a high-efficiency, vertically-oriented mist eliminator 150. Thus, even though the entrainment removal efficiency is lower than might be thought desirable for wet scrubbing towers, the entrainment separator causes very low pressure drops, e.g. less than about 0.15 inches water column, and has other advantages in terms of cleanability, drainage, high bulk gas velocities, and direction of the gas flow from the upper wall surfaces of the tower and toward a highly-efficient, vertical mist eliminator 150. The mist eliminator 150 is preferably of the baffle type, e.g. a zig-zag baffle.

The scrubbed and demisted effluent can then be discharged to the air such as by stack 160. In the an alternate embodiment, the demisted effluent is heated prior to discharge such as in a gas-to-gas heat exchanger in a vertical configuration as described in, commonly-assigned U.S. patent application Ser. No. 08/257,158, filed Jun. 9, 1994, now abandoned.

The effect of the improvements of the invention in combination is to enable construction of a single-loop, wet-scrubbing, open spray tower which is about one half the empty weight of current open spray towers. This difference in size coupled with improved $SO_x$ absorptive capacity afforded by the slurry results in an improvement in total process efficiency of roughly 30% or more over conventional systems. Total process efficiency is measured by the value of all resources expended to remove a unit of $SO_x$ from the untreated gas. These include both capital and operating resources.

The above description is for the purpose of teaching the person of ordinary skill in the art how to practice the invention, and it is not intended to detail all of those obvious modifications and variations of it which will become apparent to the skilled worker upon reading the description. It is intended, however, that all such obvious modifications and variations be included within the scope of the invention which is defined by the following claims. The claims are meant to cover the claimed elements and steps in any arrangement or sequence which is effective to meet the objectives there intended, unless the context specifically indicates the contrary.

We claim:

1. A single-loop, open-tower, countercurrent limestone wet scrubbing process for reducing the concentration of $SO_x$ in flue gases, comprising:

(a) directing a flow of flue gas containing $SO_x$ upwardly through an open vertical scrubbing tower at a bulk flow velocity of from 4.5 meters per second to up to about 6 meters per second;

(b) introducing into a vertical scrubbing section within said tower, a spray of droplets of an aqueous slurry of finely-divided calcium carbonate, calcium sulfate, dissolved calcium and inert solids to contact the flue gas while descending through the tower counter currently to the flow of flue gas to absorb $SO_x$ from the flue gas, the pH of the slurry as introduced into the scrubbing tower being within the range of from about 5.0 to about 6.3, the slurry is introduced by spray nozzles, arranged in two to three levels with a spacing between levels of less than about 2 meters, and with the direction of flow from adjacent nozzles alternating between upward and downward;

(c) collecting the slurry containing dissolved $SO_x$ in a reaction tank after contact with the flue gas;

(d) withdrawing slurry from the reaction tank after an average residence time of less than about 8 hours but sufficient to permit reaction of dissolved $SO_x$ with dissolved calcium and growth of crystals of calcium sulfate to a weight median diameter of at least 2 times as large as the calcium carbonate added as feed;

(e) subjecting slurry withdrawn from the reaction tank to a treatment effective to provide a recycle stream rich in fine particles of calcium carbonate having a weight median diameter of about 8μ or less and a molar ratio of calcium-containing to sulfur-containing compounds of at least 1.3, and another stream rich in relatively larger particles of calcium sulfate particles having a weight median diameter of at least 25μ;

(f) discharging the stream rich in calcium sulfate particles to thereby remove $SO_x$ previously dissolved in the slurry, and returning to the process a major portion of the recycle stream rich in calcium carbonate and poor in calcium sulfate; and (g) introducing fresh calcium carbonate as feed into the system in amounts sufficient to maintain the pH of the slurry in the reaction tank within the range of from 5.0 to 6.3 and to replace the calcium withdrawn and not recycled as well as that dissolved and reacted with the $SO_x$ absorbed in the liquid phase in the scrubbing section, the finely-divided calcium carbonate introduced as feed having a weight median particle size of less than about 10μ as introduced.

2. A process according to claim 1 wherein finely-divided calcium carbonate introduced as feed has a weight median particle size of less than about 8μ as introduced.

3. A process according to claim 1 wherein the tower comprises a single pass entrainment separator effective to reduce the quantity of droplets and to turn the direction of flow of the flue gases from the vertical to an orientation effective for efficient utilization of a vertically-oriented mist separator, wherein the entrainment separator includes individual single-pass separator blades, said individual blades mounted to form assemblies, said individual blades are oriented at an angle from the vertical.

4. A process according to claim 3 wherein the tower further comprises a vertically-oriented mist eliminator, and said entrainment eliminator being effective to turn the direction of flow of the flue gases by at least 30° from the vertical axis of the tower.

5. A process according to claim 1 wherein the slurry withdrawn from the reaction tank is passed to a hydrocyclone for separation.

6. A process according to claim 1 wherein the portion of the slurry in the recycle stream which is fed back the reaction tank has a solids concentration of less than 10%.

7. A process according to claim 6 wherein the molar ratio of calcium-containing to sulfur-containing compounds in the recycle stream is greater than about 1.4.

8. A process according to claim 6 wherein the recycle stream comprises less than 5% suspended solids.

9. A process according to claim 1 wherein the median size of the calcium carbonate particles in the reaction tank is within the range of from about 2 to about 6μ, and the weight median particle size of the finely-divided calcium carbonate as introduced is less than about 8μ, with 99% by weight of the particles being less than 44μ.

10. A process according to claim 1 wherein the pH of the slurry in the reaction tank is maintained within the range of from about 5.8 to about 6.3.

11. A process according to claim 1 wherein the molar ratio of calcium-containing to sulfur-containing compounds in the recycle stream is greater than about 1.4, and the recycle stream comprises less than 5% suspended solids.

12. A process according to claim 1 wherein air is supplied to the scrubbing tower to supply oxygen for the oxidation of sulfite and bisulfite ions.

13. A process according to claim 1 wherein the weight median particle size of the calcium carbonate in the droplets of slurry introduced into the scrubbing section is about 6μ or less.

14. A process according to claim 1 wherein the average residence time in the reaction tank is less than six hours.

* * * * *